L. G. QUACKENBOSS & B. J. FARRELL.
CULINARY UTENSIL.
APPLICATION FILED SEPT. 21, 1907.

900,952.

Patented Oct. 13, 1908.

Witnesses:

Inventors
Leonard G. Quackenboss,
Bartholomew J. Farrell,
By Jones, Addington & Ames,
Attorneys.

UNITED STATES PATENT OFFICE.

LEONARD G. QUACKENBOSS AND BARTHOLOMEW J. FARRELL, OF CHICAGO, ILLINOIS.

CULINARY UTENSIL.

No. 900,952.

Specification of Letters Patent.

Patented Oct. 13, 1908.

Application filed September 21, 1907. Serial No. 393,898.

*To all whom it may concern:*

Be it known that we, LEONARD G. QUACKENBOSS and BARTHOLOMEW J. FARRELL, citizens of the United States, residing at Chicago, in the county of Cook and State of Illinois, have invented new and useful Improvements in Culinary Utensils, of which the following is a full, clear, concise, and exact description, reference being had to the accompanying drawing, forming a part of this specification.

Our invention relates to culinary utensils, more particularly to covers for the ordinary cooking vessels and contemplates improved means whereby, in addition to confining steam within the vessel, the cover may be used for straining purposes to drain off the liquid contents thereof. It becomes desirable in devices of this kind to provide efficient means whereby the cover may be rigidly attached to the vessel or kettle with which it is adapted to be used, and, furthermore, to provide means whereby the kettle or vessel may be readily tilted to drain off the liquid contents thereof. With these ends in view, we provide a structure wherein these desirable results are obtained by way of simplified and improved means.

Our invention admits of various modifications which will readily suggest themselves to those skilled in the art, and we therefore do not wish to limit ourselves to the precise details of construction which we have herein set forth as exemplifications of our invention.

Figure 1:
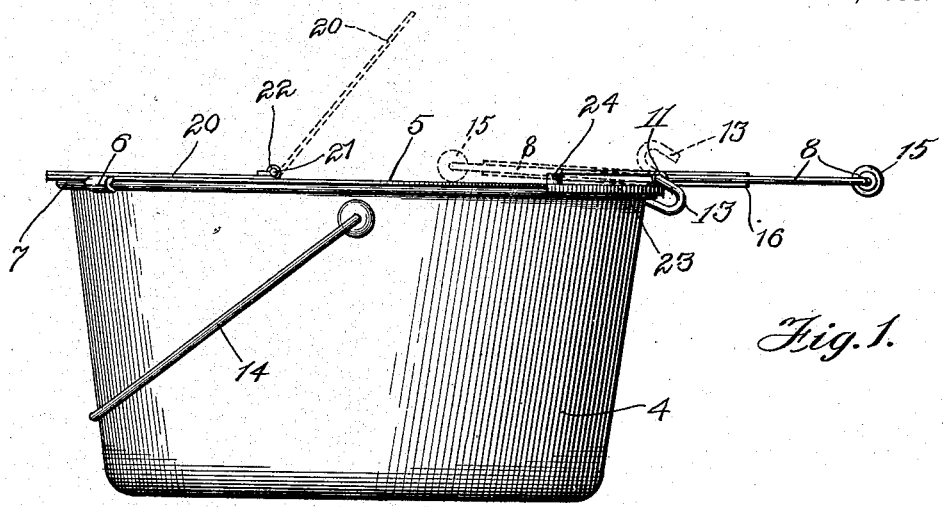
Figure 2:
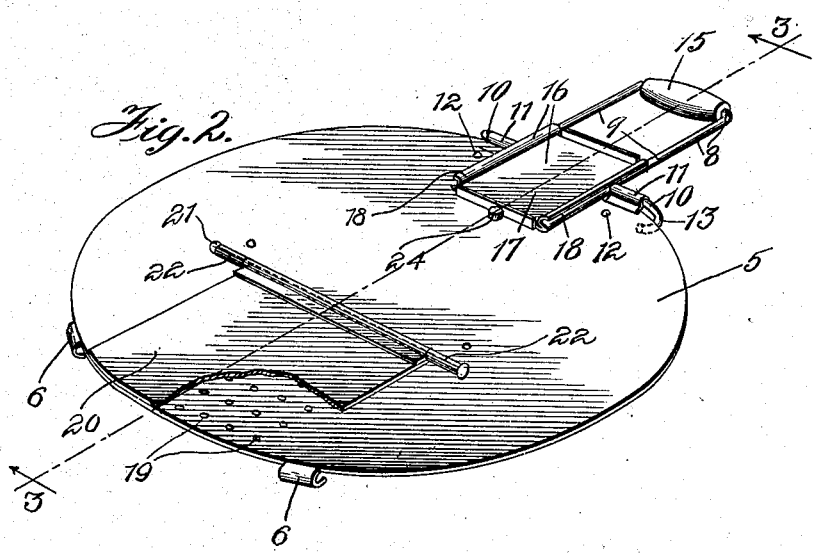
Figure 3:
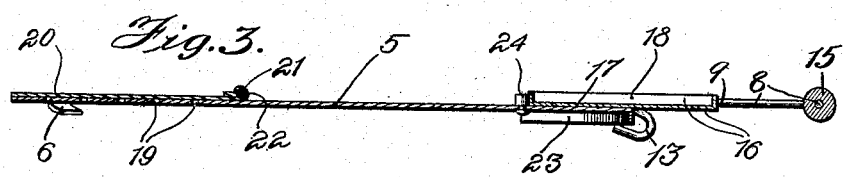

The device of our invention is illustrated in the accompanying drawings in which, Figure 1 is a side elevational view of an ordinary cooking vessel with the cover of our invention attached thereto; Fig. 2 is a perspective view of the cover of our invention; Fig. 3 is a diametrical sectional view on the line 3—3 of Fig. 2.

Like parts throughout the various figures are supplied with the same reference characters.

We have illustrated at 4 an ordinary cooking vessel to which the cover is attached. The body 5 of the cover is fashioned so as to be adapted to the ordinary cooking vessels and may be made in different sizes corresponding to the standard vessels in common use. Likewise where the vessel has a spout, a projection may be provided for the body to register therewith. At the front of the cover and preferably integral therewith are the depending lugs 6, 6, which are hook-shaped so that they may engage the annular bead 7 which is provided at the top of the usual cooking vessel as shown in the drawings. At the periphery of the body 5, opposite these hook-shaped depending lugs, the handle frame 8 is suitably mounted. This handle frame, as here shown, is in the form of a yoke having the outwardly extending members 9, 9 and the laterally extending members 10, 10. In this embodiment of our invention the handle frame 8 is pivotally supported, and, as convenient means for so mounting the same, we have illustrated the keepers 11, 11 riveted as at 12 or otherwise secured to the body 5, in which the laterally extending members 10, 10 are suitably journaled. The ends of the members 10 extend considerably beyond the keepers in which they are mounted and are fashioned into suitable hooks 13, 13, which are adapted to engage the annular bead 7 in the same manner as do the hook-shaped lugs 6, 6, thus coacting with these lugs to secure the cover rigidly in position upon the vessel. In securing the cover to the vessel it is so disposed that the handle frame extends at right angles to the line of the pivots of the bail 14, as shown in the drawings. The purpose of this mode of attachment will be hereinafter more fully explained. The outer end of the handle frame 8 is provided with a suitable grip 15 of fiber or wood, or other suitable material of low heat conducting qualities for obvious purposes.

To secure operative engagement between the handle and the kettle, the locking member 16 is provided. This member, as here shown, consists of a plate 17 which as illustrated is provided at its sides with the upwardly extending crimped flanges 18 which engage about the outwardly extending members 9 of the handle frame as clearly shown in Fig. 2. This arrangement affords such a mounting of the locking member 16 within the handle frame that it may readily slide therein and be entirely contained thereby, or be moved partly without so as to engage the upper surface of the cover. When the slide is in such engagement with the vessel cover the hook-shaped members 13, 13, are locked in engagement with the bead 7 of the vessel whereby, when the handle is properly manipulated, a purchase may be gained against the cover to tilt the vessel so as to drain off the liquid contents thereof. It is, of course, apparent that more than one handle may be employed, such an arrangement being particularly serviceable where no handle or bail is provided for the vessel itself.

In order that the cover may form efficient training means, it is provided with a foraminous portion as illustrated in the drawings, the apertures 19, 19, being arranged in any desired manner. So that these apertures may be closed when it is desired to confine the steam within the vessel, a flap cover 20 is provided. This flap cover, as here shown, is suitably hinged to a pintle 21 which is mounted in the keepers 22, 22, riveted or otherwise suitably secured to the cover body as illustrated in the drawings. This flap cover is preferably loosely mounted so that, when the vessel is tilted to pour out the liquid contents thereof, it will swing on its hinge, to open the apertures 19, 19. Any serviceable means may be provided for locking the flap cover over the strainer if desired. Not only does this flap cover serve to close the apertures when it is desired to confine the steam within the vessel, but it forms an efficient deflecting plate for preventing the steam from rising to the hand of one tilting the vessel to pour liquid therefrom. For further shielding the one tilting the vessel we provide the downwardly extending flange 23, integral with the cover, and disposed below the handle, as illustrated.

When the handle is not in use, the sliding member 16 is moved entirely within the handle frame which may then be thrown back about its hinge into the position shown in dotted lines in Fig. 1. When the handle is attached to a vessel, the handle is swung about its hinge into the position shown in full lines in this figure, whereby the hooked members 13, 13, engage the bead 7 and together with the hook-shaped depending lugs 6, form the means for securing rigid attachment. The sliding member 16 is then moved partly out of the handle frame so that it may engage the top of the cover, and it is apparent that when the member 16 is so disposed the cover will be securely locked in place. Thus, when the vessel is held by its bail, the grip 15 may be grasped and raised so as to tilt the vessel, leverage between the handle and the vessel being had by reason of the engagement of the sliding member 16 with the cover. When thus tilted, the liquid may flow through the apertures 19, the flap cover 20 swinging about its hinges, whereby the solid articles may be retained within the vessel as desired. In order that the locking member 16 may always assume its proper position, we provide suitable means for limiting the movement thereof when it is being slid out of the handle frame. We have here illustrated the stop 24, secured to the cover body, and the sliding member is adapted to engage this stop as shown in Fig. 2. It is thus seen that the cover may be readily attached to a vessel, the same means for locking the handle in its attached position being also the means whereby the vessel may be readily tilted to draw off the liquid contents thereof. With the construction herein described auxiliary mechanism for the opening of the apertures is not necessitated, and a simply constructed and easily manipulated device of the character set forth is procured.

Having thus described our invention, what we claim as new and desire to secure by Letters Patent is:

1. In a vessel cover, the combination with a body portion, of means thereon for engaging a vessel, a handle pivotally mounted upon said body portion, vessel engaging means rigid upon said handle and movable therewith relative to said body portion, and a locking member for operatively connecting said handle and said body portion.

2. In a vessel cover, the combination with a body portion, of means thereon for engaging a vessel, a handle pivotally mounted upon said body portion, means on said handle for engagement with the vessel, and a locking member for locking said handle to said body portion in position extending laterally from said body portion.

3. In a vessel cover, the combination with a body portion, of means on said body portion for engaging a vessel, a handle pivotally mounted upon said body portion, means on said handle for engagement with the vessel, and a locking member slidable relative to said handle for locking said handle to said vessel.

4. In combination, a vessel cover having a foraminous portion, means thereon for engaging a vessel, a handle pivotally mounted upon said cover, vessel engaging means rigid upon said handle and movable therewith relative to said cover, and means for operatively connecting said handle with said vessel.

5. In combination, a vessel cover having a foraminous portion, means thereon for engaging a vessel, a handle pivotally mounted upon said cover, means on said handle for engagement with the vessel, and a locking member for locking said means in such engaging position.

6. In combination, a vessel cover having a foraminous portion, lugs depending from said cover for engagement with the vessel, a handle pivotally mounted upon said cover, and means rigid upon said handle and movable therewith relative to said cover for engaging with said vessel, said engaging means on said handle being brought into and out of engagement with said vessel by movement of said handle upon its pivot.

7. In combination, a vessel cover having a foraminous portion, lugs depending from said cover for engagement with the vessel, a handle pivotally mounted upon said cover, means rigid upon said handle and movable therewith relative to said cover for engagement with said vessel, and a locking member for locking said means in such engaging position.

8. In combination, a vessel cover having a foraminous portion, lugs depending from said cover for engagement with the vessel, a handle pivoted to said cover, means on said handle for engagement with said vessel, and a locking member for locking said means in such engaging position and said handle in position extending laterally from said cover.

9. In combination, a cover having a foraminous portion, a lug depending from said cover for engaging the vessel, a handle frame pivoted to said cover, means on said handle frame for engagement with the vessel, and a sliding locking member mounted in said handle frame for operatively connecting said handle and said cover.

10. In combination, a vessel cover having a foraminous portion, lugs depending therefrom for engagement with the vessel, an auxiliary cover for said foraminous portion, a handle frame pivoted to said cover, means on said handle for co-acting with said depending lugs to secure the cover to said vessel, and a sliding member in said handle frame arranged to assume a position within said frame and a position partly without the same to engage said cover to lock said handle to the vessel.

11. In a vessel cover, the combination with a body portion, of means on said body portion for engaging a vessel, a handle frame pivotally mounted on said body portion, vessel-engaging means movable with said handle frame, and a locking member slidable in said handle frame for locking said handle to said body portion.

12. In a vessel cover, the combination with a body portion, of means on said body portion for engaging a vessel, a handle frame pivotally mounted on said body portion, a vessel-engaging means movable with said handle frame, and a locking member slidable in said handle frame and arranged to assume a position within said frame and a position partly without said frame to engage said body portion to lock said handle frame thereto.

In witness whereof we have hereunto subscribed our names in the presence of two witnesses.

LEONARD G. QUACKENBOSS.
BARTHOLOMEW J. FARRELL.

Witnesses:
W. PERRY HAHN,
M. R. ROCHFORD.